US012525736B2

(12) United States Patent
Tanaka et al.

(10) Patent No.: US 12,525,736 B2
(45) Date of Patent: Jan. 13, 2026

(54) CABLE TERMINAL AND CONNECTOR

(71) Applicant: Molex, LLC, Lisle, IL (US)

(72) Inventors: Risa Tanaka, Yamato (JP); Teruki Nagase, Yamato (JP)

(73) Assignee: Molex, LLC, Lisle, IL (US)

( * ) Notice: Subject to any disclaimer, the term of this patent is extended or adjusted under 35 U.S.C. 154(b) by 532 days.

(21) Appl. No.: 17/924,684

(22) PCT Filed: Jun. 7, 2021

(86) PCT No.: PCT/IB2021/054960
§ 371 (c)(1),
(2) Date: Nov. 11, 2022

(87) PCT Pub. No.: WO2021/250534
PCT Pub. Date: Dec. 16, 2021

(65) Prior Publication Data
US 2023/0187869 A1 Jun. 15, 2023

(30) Foreign Application Priority Data
Jun. 8, 2020 (JP) ................................ 2020-099507

(51) Int. Cl.
*H01R 13/436* (2006.01)
*H01R 13/639* (2006.01)

(52) U.S. Cl.
CPC ....... *H01R 13/4367* (2013.01); *H01R 13/639* (2013.01)

(58) Field of Classification Search
CPC .......................... H01R 13/4367; H01R 13/639
See application file for complete search history.

(56) References Cited

U.S. PATENT DOCUMENTS 4,655,525 A 4/1987 Hunt
4,946,398 A * 8/1990 Takenouchi ....... H01R 13/4368 439/752
4,984,998 A * 1/1991 Duncan .............. H01R 13/6272 439/352
5,071,373 A * 12/1991 Nagasaka .......... H01R 13/4368 439/752
(Continued)

FOREIGN PATENT DOCUMENTS

CN 111092318 B 2/2022
JP H0636235 U 5/1994
(Continued)

OTHER PUBLICATIONS

International Preliminary Report on Patentability and written opinion received for PCT application No. PCT/ B2021/054960, mailed on Dec. 22, 2022, 10 pages.
(Continued)

*Primary Examiner* — Neil Abrams

(57) ABSTRACT

To reduce the height of a connector having a retainer in which a positioning post is formed. A cable terminal, having an inclined part which is formed between a front upper plate part and a rear upper plate part and which is inclined to approach a center line toward the rear side. The retainer has the positioning post that is positioned to the rear of the inclined part and restricts movement of the cable terminal in the rearward direction of the cable terminal.

19 Claims, 14 Drawing Sheets

(56) References Cited

U.S. PATENT DOCUMENTS

| | | | | |
|---|---|---|---|---|
| 5,931,707 | A * | 8/1999 | Ito | H01R 13/4368 439/752 |
| 6,206,727 | B1 * | 3/2001 | Aoyama | H01R 4/184 439/585 |
| 6,575,795 | B1 * | 6/2003 | Kashiyama | H01R 13/4368 439/752 |
| 8,622,769 | B2 * | 1/2014 | Mizutani | H01R 13/113 439/595 |
| 2006/0035536 | A1 * | 2/2006 | Sai | H01R 13/4365 439/752 |
| 2006/0281373 | A1 * | 12/2006 | Anbo | H01R 13/4367 439/752 |
| 2015/0099386 | A1 | 4/2015 | Morello et al. | |
| 2016/0006135 | A1 * | 1/2016 | Terashima | H01R 43/05 174/72 A |
| 2023/0187869 | A1 * | 6/2023 | Tanaka | H01R 13/639 439/752 |
| 2023/0187870 | A1 * | 6/2023 | Tanaka | H01R 13/4367 439/752 |

FOREIGN PATENT DOCUMENTS

| | | | |
|---|---|---|---|
| JP | H06275334 | A | 9/1994 |
| JP | 2004172033 | A | 6/2004 |
| JP | 2011165348 | A | 8/2011 |
| JP | 2015095379 | A | 5/2015 |
| KR | 20080019056 | A | 2/2008 |
| KR | 20100104029 | A | 9/2010 |
| KR | 20160118145 | A | 10/2016 |
| TW | M584553 | U | 10/2019 |

OTHER PUBLICATIONS

International search report and written opinion received for PCT application No. PCT/IB2021/054960, mailed on Sep. 6, 2021, 7 pages.

* cited by examiner

CABLE TERMINAL AND CONNECTOR

RELATED APPLICATIONS

This application is a national phase of PCT/IB2021/054960, filed Jun. 7, 2021 which claims priority Japanese Patent Application No. 2020-099507, filed Jun. 8, 2020, which is are incorporated herein by reference in their entireties.

TECHNICAL FIELD

The present disclosure relates to a cable terminal and to a connector to which a cable terminal is mounted.

BACKGROUND ART

Patent Document 1 listed below discloses a connector having a housing with a terminal storage chamber into which a cable terminal is inserted and a retainer attached to the housing for preventing release of the cable terminal (in other words, rearward movement from the terminal storage chamber). The cable terminal includes a locking part. The retainer has a terminal locking piece extending forward. The terminal locking piece is located at the rear side of the cable terminal locking piece and restricts the rearward movement of the cable terminal.

Prior Art Documents; Patent Documents; Patent Document 1: Japanese Unexamined Patent Application No. H06-275334

SUMMARY

In the connector of Patent Document 1, the terminal locking piece extends forward from the base of the retainer and is arranged on the upper side of the rear part of the cable terminal. Then, the front part of the terminal locking piece is bent downward, and the tip of the terminal locking piece abuts the rear side of the cable terminal locking piece. With this structure, the height of the terminal locking piece is high. This results in a problem that the height of the connector is high.

An example of a connector proposed in the present disclosure includes a cable terminal formed by a metal plate and provided at an end of a cable, a housing that houses the cable terminal and forms a terminal housing chamber into which the cable terminal can be inserted from the rear side facing frontward, and a retainer attached to the housing. The cable terminal has a terminal front part having a front plate part formed along a center line of the cable terminal in the front-rear direction, a terminal rear part having a rear plate part formed along the center line of the cable terminal, and an inclined part formed between the front plate part and the rear plate part and inclined to approach the center line toward the rear side. The retainer has a positioning post that is positioned to the rear of the inclined part and restricts movement of the cable terminal in the rearward direction of the cable terminal. With this structure, the position of the positioning post relative to the cable terminal can be lowered.

An example of a cable terminal proposed in the present disclosure is a cable terminal formed a by metal plate and provided at an end of a cable, including a terminal front part having a front plate part formed along a center line of the cable terminal in the front-rear direction, a terminal rear part having a rear plate part formed along the center line of the cable terminal, and an inclined part formed between the front plate part and the rear plate part and inclined to approach the center line toward the rear side. At least one part of the inner edge of a hole that goes through the metal plate is positioned in the inclined part. With this connector, the height of the connector can be reduced. In addition, since a through hole is formed in the metal plate, force can be efficiently applied to the cable terminal from the positioning post of the retainer.

DETAILED DESCRIPTION OF THE PREFERRED EMBODIMENTS

A connector proposed in the present disclosure will be described below. Hereinafter, an X1 direction and X2 direction illustrated in FIG. 1, and the like are respectively referred to as a right direction and left direction, a Y1 direction and Y2 direction are respectively referred to as a forward direction and rearward direction, and a Z1 direction and Z2 direction are respectively referred to as an upward direction and downward direction. These directions are used to describe the relative positional relationships of various parts of the connector, and do not limit orientation of the connector when attached to another device.

Entire Body

Figure 1:
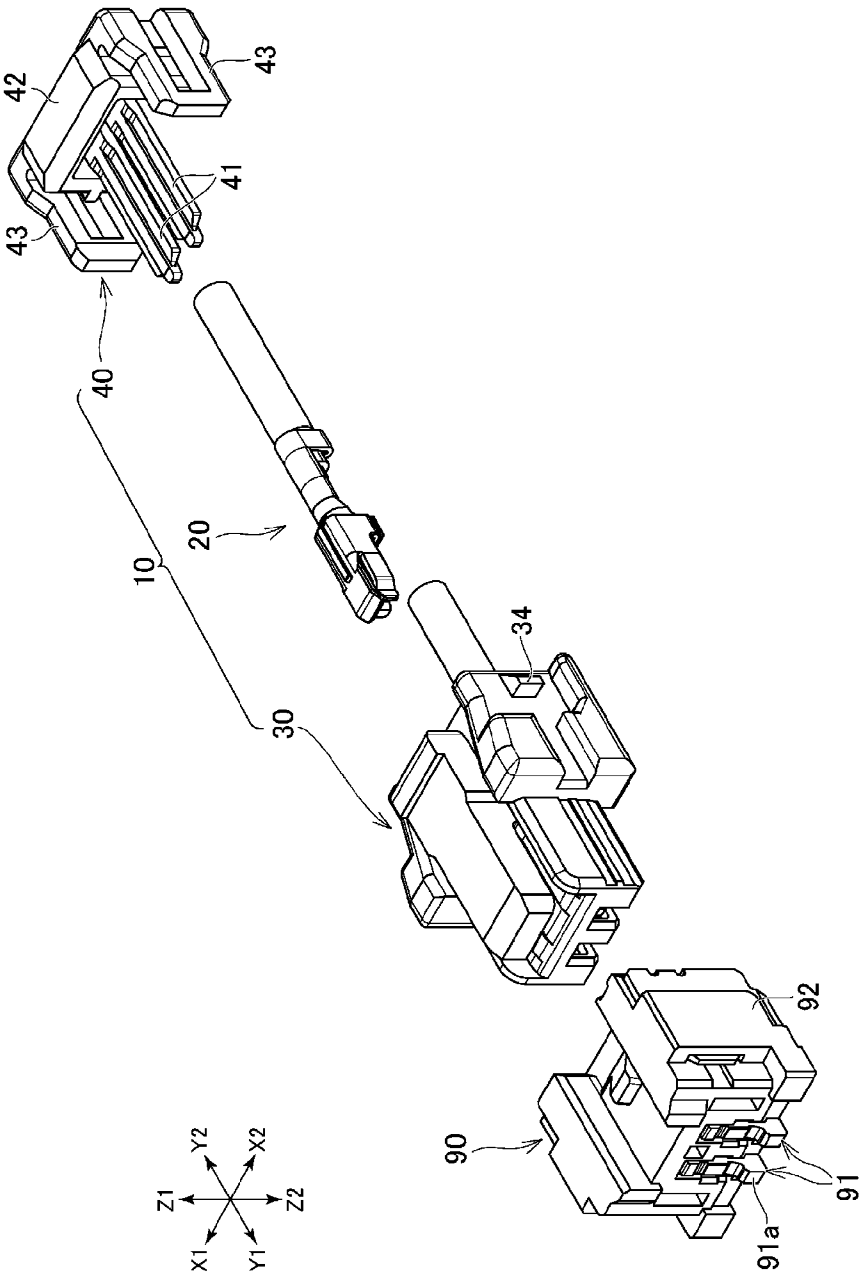
FIG. 1 is an exploded perspective view illustrating an example of a connector assembly containing a connector proposed in the present disclosure.

As illustrated in FIG. 1, a connector assembly has a connector 10 and a mating connector 90 that can be combined in a forward-rearward direction. As illustrated in FIG. 1, the connector 10 has a plurality of cable terminals 20, a housing 30 that holds the cable terminals 20, and a retainer 40 attached to the housing 30. The mating connector 90 has a plurality of terminals 91 and a housing 92 that holds the terminals 91.

The mating connector 90 has two terminals 91 arranged in the left-right direction, for example. The mating connector 90 is a connector provided on a circuit board (not illustrated), for example, and the terminal 91 may have a connecting part 91*a* that is connected to a conductor pattern of the circuit board at an end part thereof.

Figure 2:
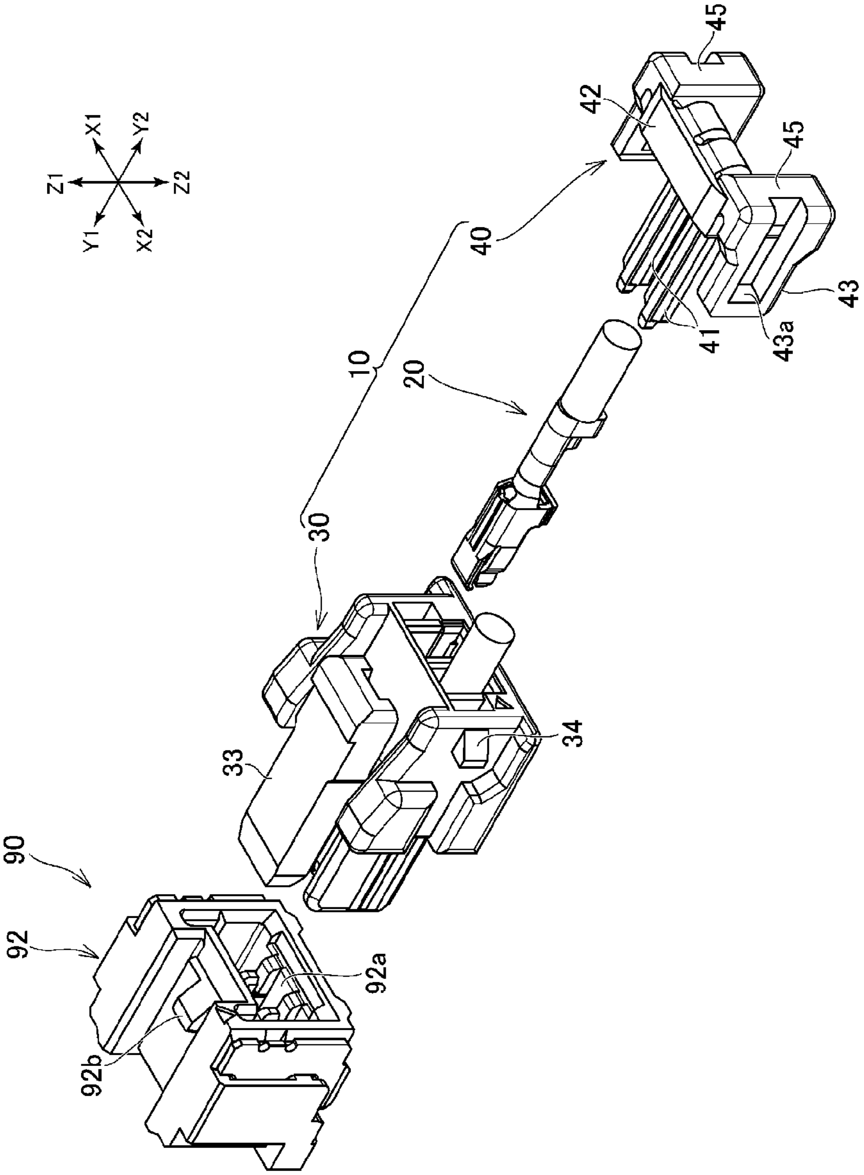
FIG. 2 is an exploded perspective view of the connector assembly.

The housing 92 of the mating connector 90 may have a box-shaped mating part 92*a* (refer to FIG. 2) that opens toward the connector 10. A contact part of the terminal 91 is stored inside the mating part 92*a*. The housing 30 of the connector 10 fits inside the mating part 92*a*, and the plurality of cable terminals 20 respectively come into contact with the plurality of terminals 91. The housing 30 may have a locking mechanism that engages with the housing 92 of the mating connector 90. As illustrated in FIG. 2, the housing 30 has a locking lever 33, for example, as the locking mechanism. A hook formed on a front end of the locking lever 33 hooks on a part to be engaged 92*b* formed on an upper side of the housing 92. This restricts separation between the connector 10 and the mating connector 90.

The number of cable terminals 20 provided by the connector 10 and the number of terminals 91 provided in the mating connector 90 may also be more than two or may be one. Furthermore, the plurality of cable terminals 20 may be aligned not only in the left-right direction but also in the vertical direction. Similarly, the terminals 91 of the mating connector 90 may also be aligned not only in the left-right direction but also in the vertical direction. Furthermore, the mating connector 90 may be, for example, a connector that is attached to an end part of a cable, rather than a connector provided on a circuit board. In this case, the mating connector may be a connector provided with a housing to which the retainer of the present disclosure can be attached, and a cable terminal (refer to FIG. 8), as disclosed later.

Connector Overview

A terminal storage chamber S (refer to FIG. 7B) for storing the cable terminal 20 is formed in the housing 30. The terminal storage chamber S passes through the housing 30 in the front-rear direction, and the cable terminal 20 is inserted into the terminal storage chamber S from a rear side to a front side of the housing 30. The connector 10 has two cable terminals 20 arranged in the left-right direction. The same number of terminal storage chambers S that are aligned in the left-right direction are formed in the housing 30.

Figure 3C:
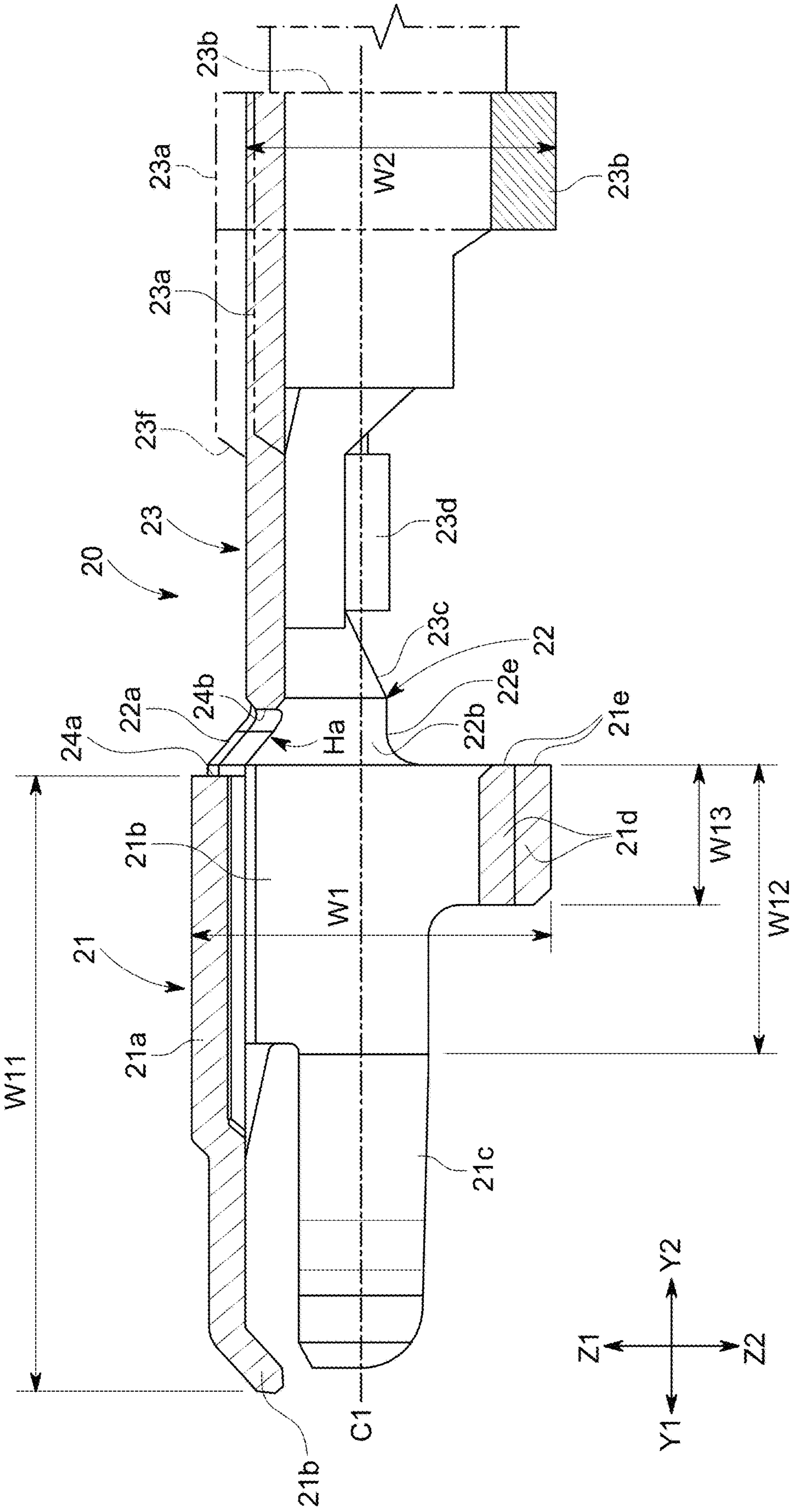
FIG. 3C is a cross-sectional view of the cable terminal obtained at a cutting surface indicated by line IIIc-IIIC in FIG. 3A.
Figure 4A:
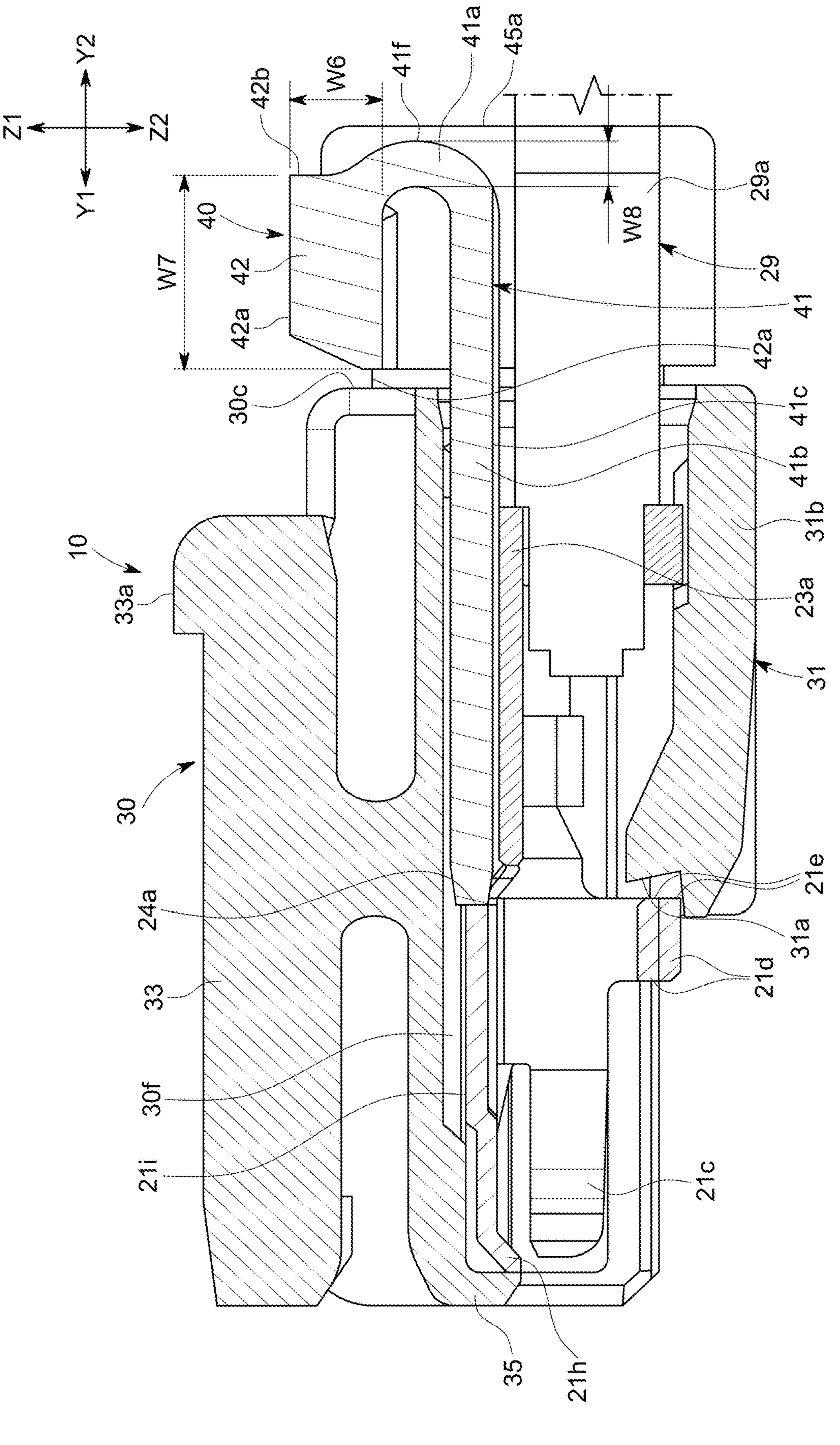
FIG. 4A is a cross-sectional view of the connector. A condition is illustrated where the cable terminal is provided at an appropriate position of the terminal storage chamber, and the retainer is attached to a housing.

A stopped part 21*e* (refer to FIG. 3C) described later is formed on the cable terminal 20. As illustrated in FIG. 4A, the housing 30 has a locking arm 31 at a lower portion thereof. The locking arm 31 hooks on the stopped part 21*e* and restricts movement of the cable terminal 20 in the rearward direction. Hereinafter, a position of the cable terminal 20 on which the locking arm 31 hooks (position of the cable terminal 20 illustrated in FIG. 4A) is referred to as an appropriate position. Furthermore, the stopped part 21*e* is referred to as a "second stopped part".

A stopped part 24*a* (refer to FIG. 3C) is formed on the cable terminal 20. In the example of the connector 10, the stopped part 24*a* is part of an inner edge of a hole Ha formed in the cable terminal 20. The retainer 40 has a positioning post 41 (refer to FIG. 1) extending in the forward direction. The positioning post 41 is positioned to the rear of the stopped part 24*a*, and restricts movement of the cable terminal 20 in the rearward direction (detaching from the appropriate position in the terminal storage chamber S). Furthermore, in a process of inserting the cable terminal 20 into the terminal storage chamber S, if the cable terminal 20 does not reach the appropriate position in the terminal storage chamber S, the positioning post 41 pushes the stopped part 24*a* in the forward direction when the retainer 40 is attached to the housing 30, thereby bringing the cable terminal 20 into the appropriate position. In other words, the positioning post 41 prevents partial mating between the cable terminal 20 and the housing 30. Hereinafter, the stopped part 24*a* is referred to as a "first stopped part". Furthermore, in the process of inserting the cable terminal 20 into the terminal storage chamber S, if the cable terminal 20 does not reach the appropriate position in the terminal storage chamber S, and the second stopped part 21*e* is positioned further to the rear than the stopper part 31*a*, the positioning post 41 contacts the second stopped part 24*a* and presses the cable terminal 20 in an inserting direction, and the second stopped part 21*e* presses the stopper part 31*a* down and goes over the stopper part 31*a*, when the retainer 40 is attached to the housing 30.

Figure 5:
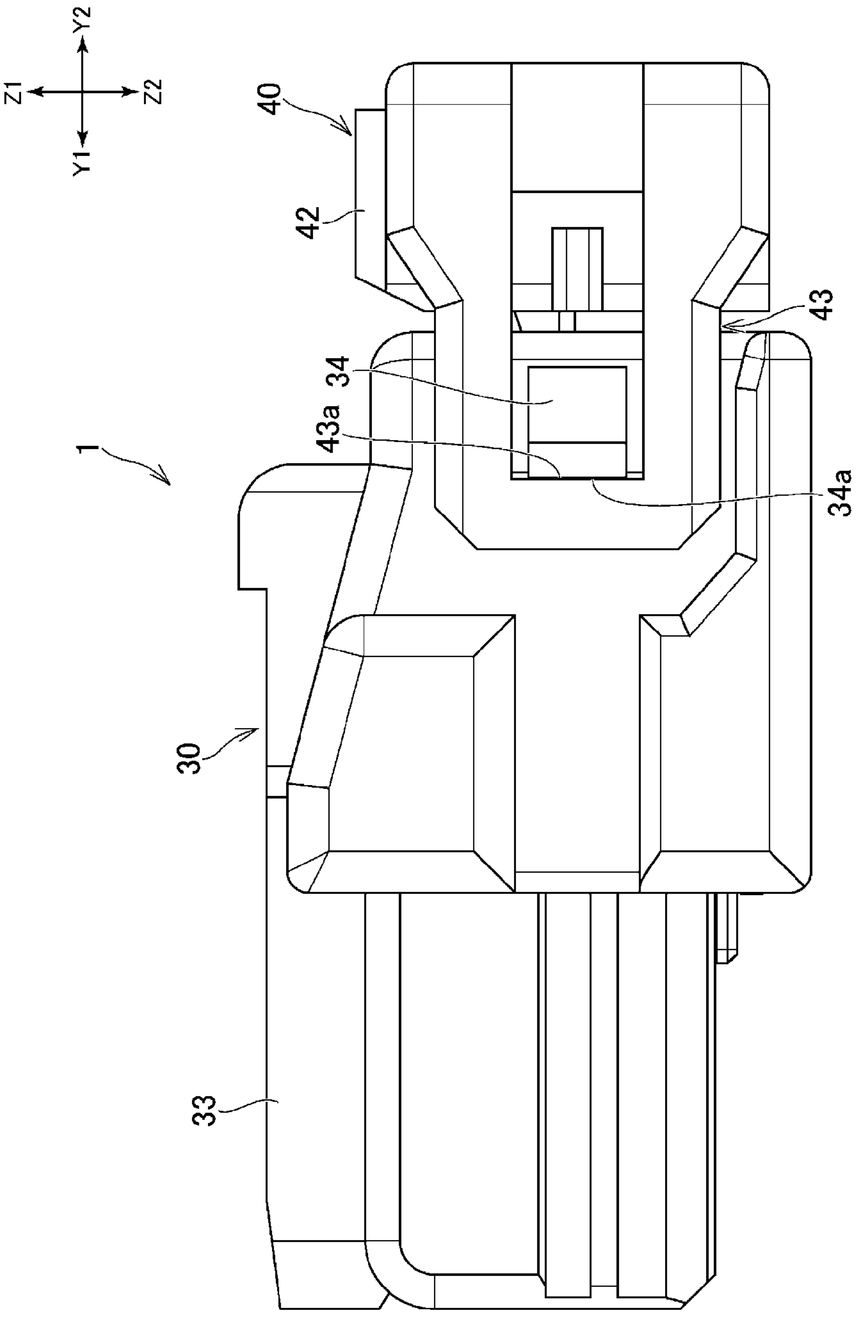
FIG. 5 is a side surface view of the connector in the same state as FIG. 4A. A condition is illustrated where the retainer is attached to the housing.

As illustrated in FIGS. 2 and 5, the housing 30 may have a part to be engaged 34. The part to be engaged 34 may be formed on left and right side surfaces of the housing 30, for example. The part to be engaged 34 may be a protruding part that protrudes from the side surface. Meanwhile, the retainer 40 may have engaging parts 43 on left and right side parts thereof. As illustrated in FIG. 5, the engaging part 43 is a substantially U-shaped site in a side surface view extending toward the side surface of the housing 30, for example. When the part to be engaged 34 engages with the engaging part 43, the part to be engaged 34 is provided inside the engaging part 43 and restricts movement of the retainer 40 in the rearward direction relative to the housing 30 (for example, separation between the retainer 40 and the housing 30).

The shape of the engaging part 43 and the part to be engaged 34 is not limited to the example of the connector 10, so long as the shape of the engaging part 43 and the part to be engaged 34 restrict separation between the housing 30 and the retainer 40. Furthermore, unlike the example of the connector 10, a protruding part is formed on the side surface of the retainer 40 as the engaging part 43, and the part to be engaged 34 may be formed on a side part of the housing 30, extending toward the retainer 40.

Cable Terminal

The cable terminal 20 will be described in detail. The cable terminal 20 is a member formed from a metal plate by press working (for example, a copper plate, an aluminum plate, or the like). Specifically, press working includes punching, bending, drawing, and the like.

Figure 3A:
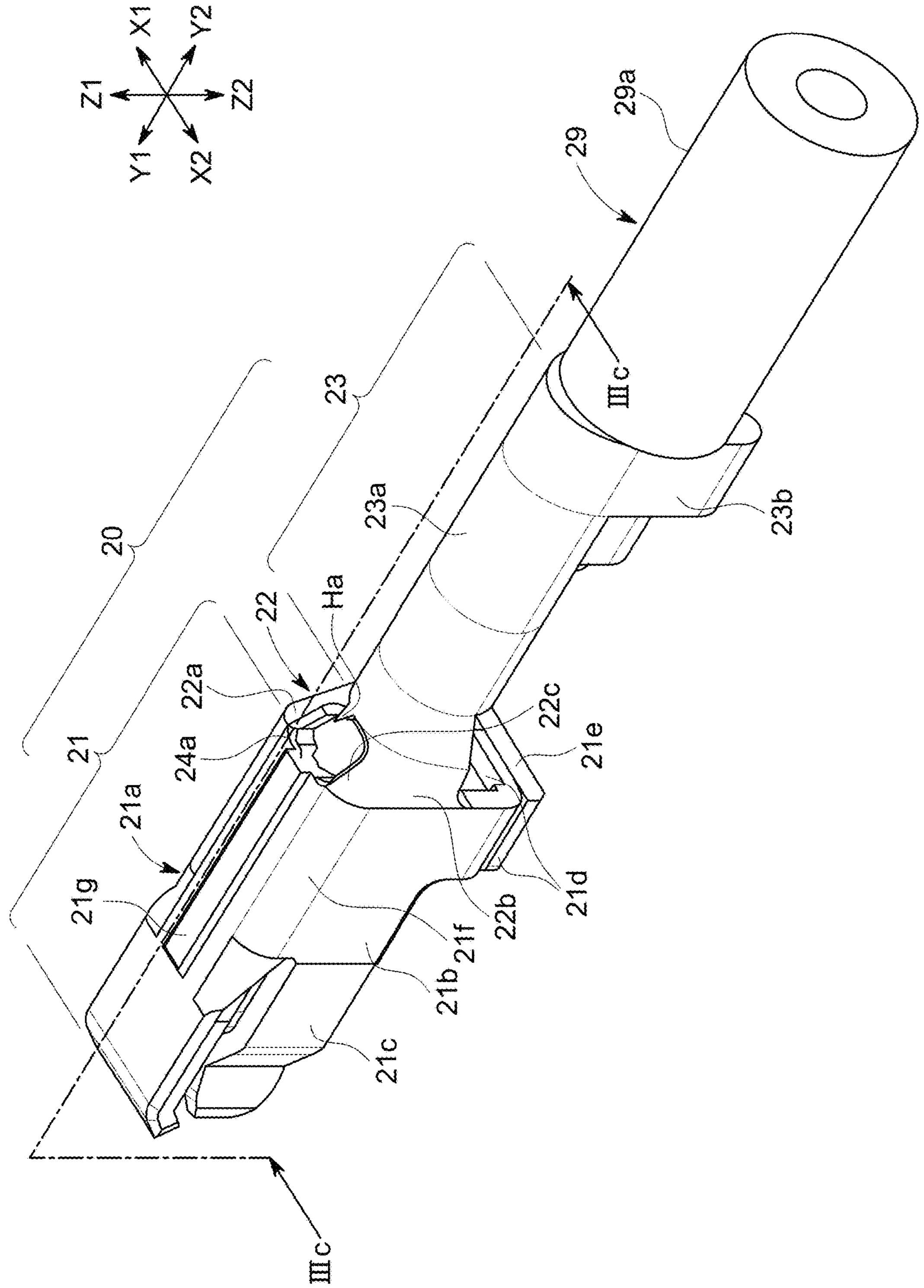
FIG. 3A is a perspective view of a cable termina.
Figure 3B:
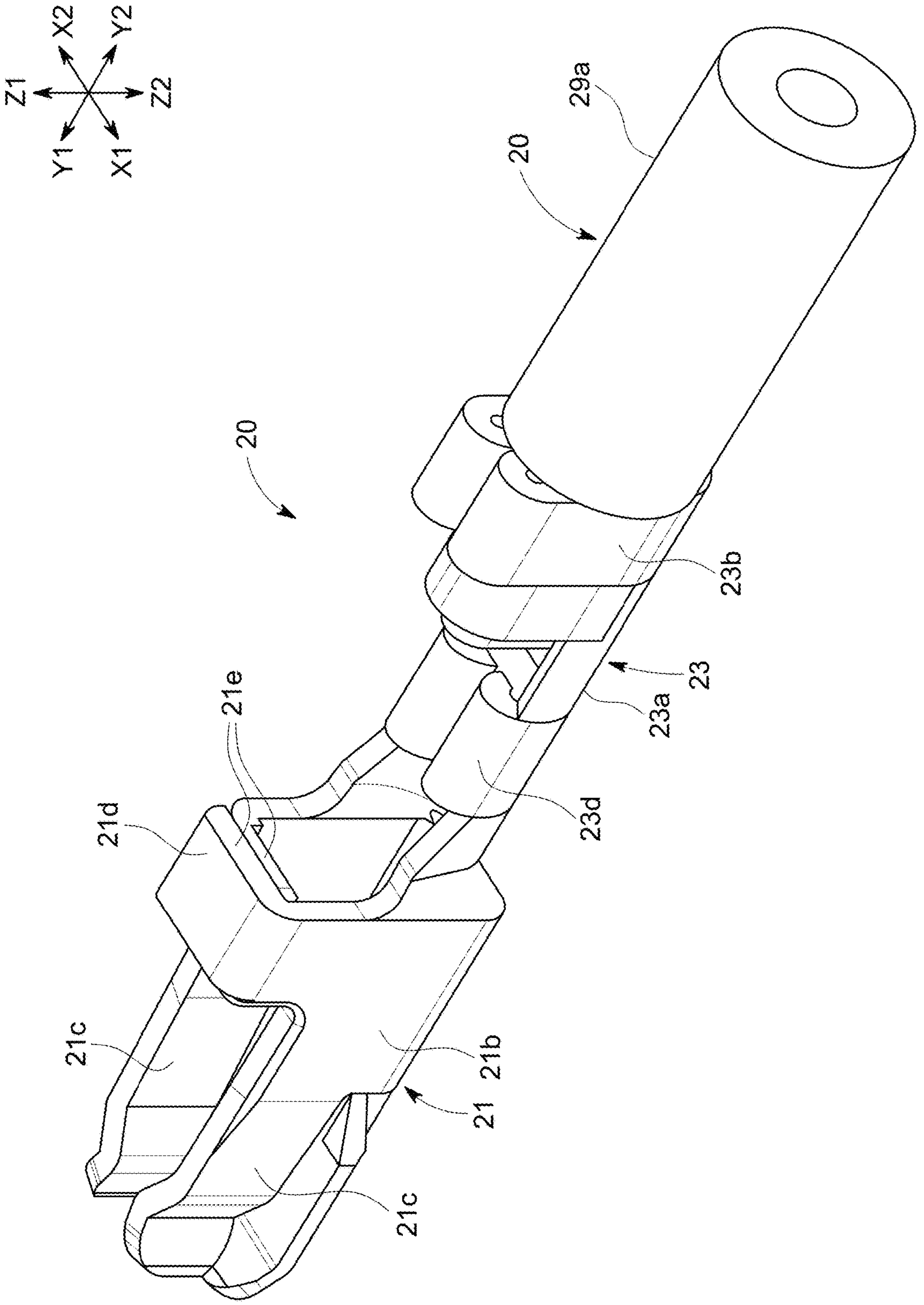
FIG. 3B is a perspective view of the cable terminal.

As illustrated in FIG. 3A, the cable terminal 20 has: a terminal front part 21 having a front upper plate part 21*a* formed along a center line C1 (refer to FIG. 3C) along the front-rear direction; and a terminal rear part 23 having a rear upper plate part 23*a* formed along the center line C1.

As illustrated in FIG. 3A, the terminal front part 21 may have side plate parts 21*b* that descend from a right edge and left edge of the front upper plate part 21*a*. The front upper plate part 21*a* and the side plate parts 21*b* surround the center line C1. The cable terminal 20 may have a contact part 21*c* extending in the forward direction from front ends of left and right side plate parts 21*b*. Left and right contact parts 21*c* are formed so as to face each other, and may be elastically deformable such that an interval between the left and right contact parts 21*c* increases or decreases. The terminal 91 of the mating connector 90 is inserted between and contacts the two contact parts 21*c*.

Figure 3D:
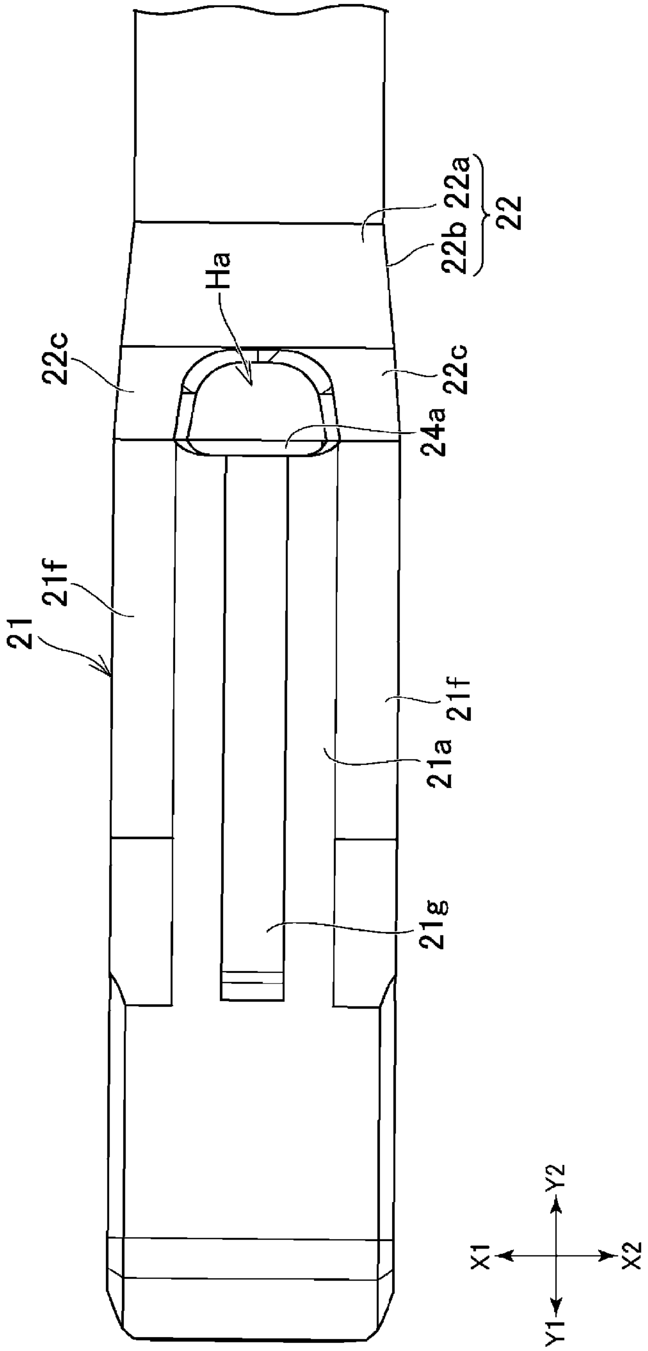
FIG. 3D is a plan view of a terminal front part provided by the cable terminal.

The front upper plate part 21*a* is positioned in an upward direction from the contact parts 21*c*. As illustrated in FIG. 3D, in a plan view of the cable terminal 20, an entire body of the contact parts 21 may be covered by the front upper plate part 21*a*. Thereby, the contact part 21*c* can be protected by the front upper plate part 21*a*. As illustrated in FIG. 3C, a front end of the front upper plate part 21*a* is positioned further in the forward direction than a front end of the contact part 21*c*. Thereby, the front end of the contact part 21*c* can be protected by the front upper plate part 21*c*.

As illustrated in FIG. 3C, a front end 21*h* of the front upper plate part 21*a* is bent in the downward direction. In other words, the front end 21*h* of the front upper plate part 21*c* is bent toward the center line C1 of the cable terminal 20. When the cable terminal 20 is inserted into the terminal storage chamber S, if the front end 21*h* of the front upper plate part 21*c* collides with an edge of the terminal storage chamber S, the cable terminal 20 can be guided to an inner side of the terminal storage chamber S by inclining the front end 21*h*.

The cable terminal 20 has two bottom plate parts 21*d* that extend from lower edges of the left and right side plate parts 21*b*, respectively. The bottom plate part 21*d* is positioned on an opposite side from the front upper plate part 21*a* with the center line C1 interposed therebetween. The two bottom plate parts 21*d* may mutually overlap. Thereby, the strength of the cable terminal 20 can be increased.

As illustrated in FIG. 3C, a length W12 in the front-rear direction of the side plate part 21*b* is smaller than a length W11 in the front-rear direction of the front upper plate part 21*a*. A length W13 of the bottom plate part 21*d* in the front-rear direction is smaller than the length W12 in the front-rear direction of the side plate part 21*b*. The bottom plate part 21*d* is formed only at a rearmost part of the terminal front part 21 and may not be formed between the left and right contact parts 21*c*. By doing so, the width in the vertical direction of the front part of the cable terminal 20 can be reduced. Furthermore, since the bottom plate part 21*d* is formed only at the rearmost part of the terminal front part 21, the length of the bottom plate part 21*d* in the front-rear direction is shorter than that of the front upper plate part 21*a*. However, because the two bottom plate parts 21*d* mutually overlap, the strength thereof can be maintained without reducing mechanical strength.

Figure 7A:
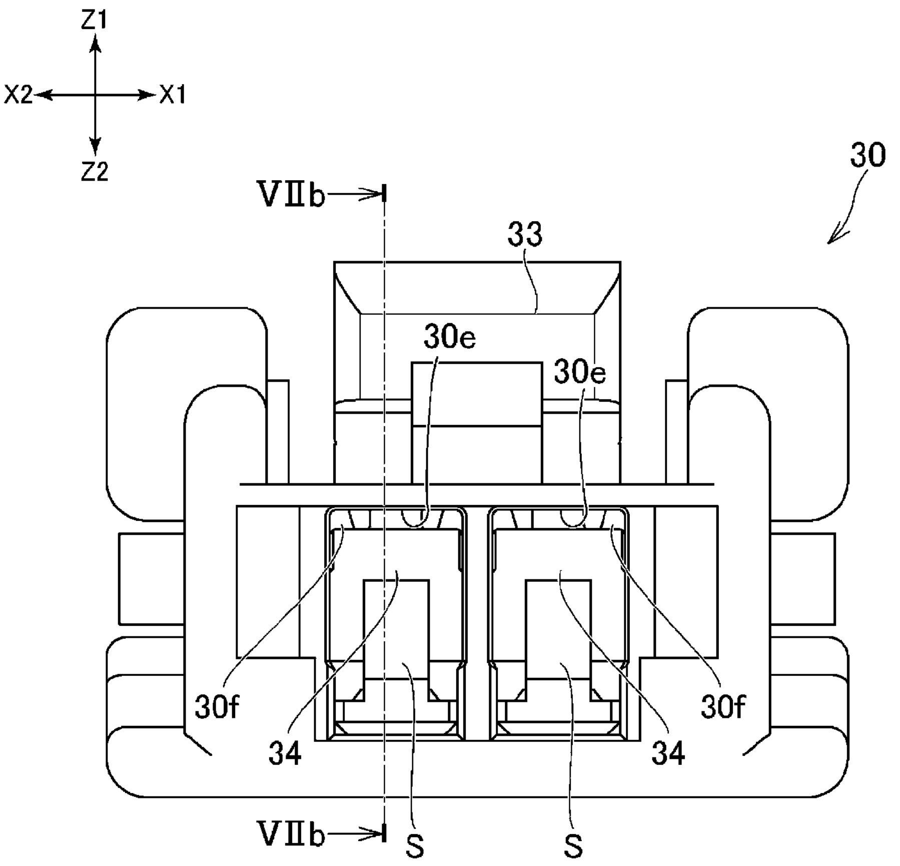
FIG. 7A is a rear surface view of the housing.
Figure 7B:
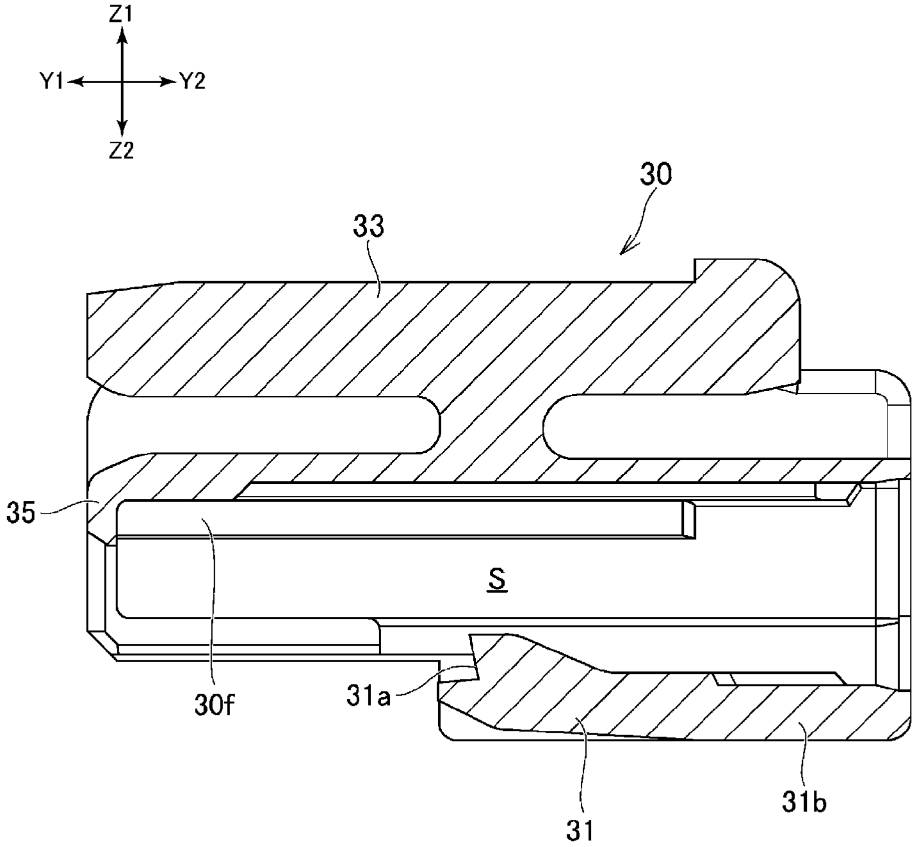
FIG. 7B is a cross-sectional view of the housing obtained at a cutting surface indicated by line VIIb-VIIb in FIG. 7A.

As illustrated in FIG. 3A, the protruding part 21*g* extending in the front-rear direction may be formed on the front upper plate part 21*a* of the terminal front part 21. Thereby, the strength of the front upper plate part 21*a* can be improved. An inner surface of the terminal storage chamber S of the housing 30 has an upper side surface facing the front upper plate part 21*a* of the terminal front part 21 inserted into the terminal storage chamber S. As illustrated in FIG. 7A, a recessed part 30*e* along the front-rear direction may be formed on the upper side surface of the inner surface of the terminal storage chamber S. Protruding parts 30*f* that relatively protrude may be formed on a right side and left side of the recessed part 30*fe*. When the terminal front part 21 is inserted into the terminal storage chamber S, the protruding part 21*g* formed on the front upper plate part 21*a* is provided inside the recessed part 30*e*. By doing so, the cable terminal 20 can be prevented from being inserted into the terminal storage chamber S in an orientation in which an upper side and lower side are reversed.

The terminal rear part 23 may have cable holding parts 23*b*, 23*d* extending from a rearmost part of the rear upper plate part 23*a*. The cable holding parts 23*b*, 23*d* are sites formed by folding a metal plate, for example The cable holding part 23*b* extends from a right side and left side of the rearmost part of the rear upper plate part 23*a*. The cable holding part 23*d* is formed in the forward direction from the cable holding part 23*b* and extends from the right side and the left side of the rear upper plate part 23*a*. The cable holding part 23*b* of the rearmost part is crimped to and holds an outer skin 29*a* of a cable 29. The outer skin 29*a* of the cable 29 is removed at an end part of the cable 29, and the cable holding part 23*d* on a front side is electrically connected to a conductive wire of the cable 29.

As illustrated in FIGS. 3A and 3C, the height of the upper surface (surface facing the Z1 direction) of the rear upper plate part 23*a* may be constant in an extending direction (front-rear direction) of the rear upper plate part 23*a*. Meanwhile, when the cable 29 held by the cable holding part 23*b* is thicker than the illustrated example, the rear upper plate part 23*a* may have a step 23*f* such that the position of a rear part of the rear upper plate part 23*a* is higher than the position of the front part of the rear upper plate part 23*a*, as indicated by the two-dot chain line in FIG. 3C. Furthermore, the cable holding part 23*b* may have a higher height (width in the vertical direction), as indicated by the two-dot chain line. In this case, the position of an upper part of an inclined part 22*a*, described later, of the cable terminal 20 is preferably higher than the rear part of the rear upper plate part 23*a* (upper edge of the step 23*f*). In other words, the position of the upper part of the inclined part 22*a*, described later, of the cable terminal 20 is preferably higher than a horizontal plane passing through the rear part of the rear upper plate part 23*a*. By doing so, the inclined part 22*a* can be pushed in the forward direction by the positioning post 41 of the retainer 40.

Coupling Part

As illustrated in FIG. 3A, the cable terminal 20 may have a coupling part 22 positioned between the front upper plate part 21*a* and the rear upper plate part 23*a*. The coupling part 22 has the inclined part 22*a* on the upper part thereof. The inclined part 22*a* is inclined with respect to the center line C1 so as to approach the center line C1 of the cable terminal 20 from the front end toward the rear end thereof.

As illustrated in FIG. 3C, the rear upper plate part 23*a* may extend straight along the center line C1. In other words, the rear upper plate part 23*a* may be parallel to the center line C1. Due to the presence of the inclined part 22*a*, the position of the rear upper plate part 23*a* is lower than that of the front upper plate part 21*a*. In other words, the distance between the rear upper plate part 23*a* and the center line C1 is less than the distance between the front upper plate part 21*a* and the center line C1.

Figure 6A:
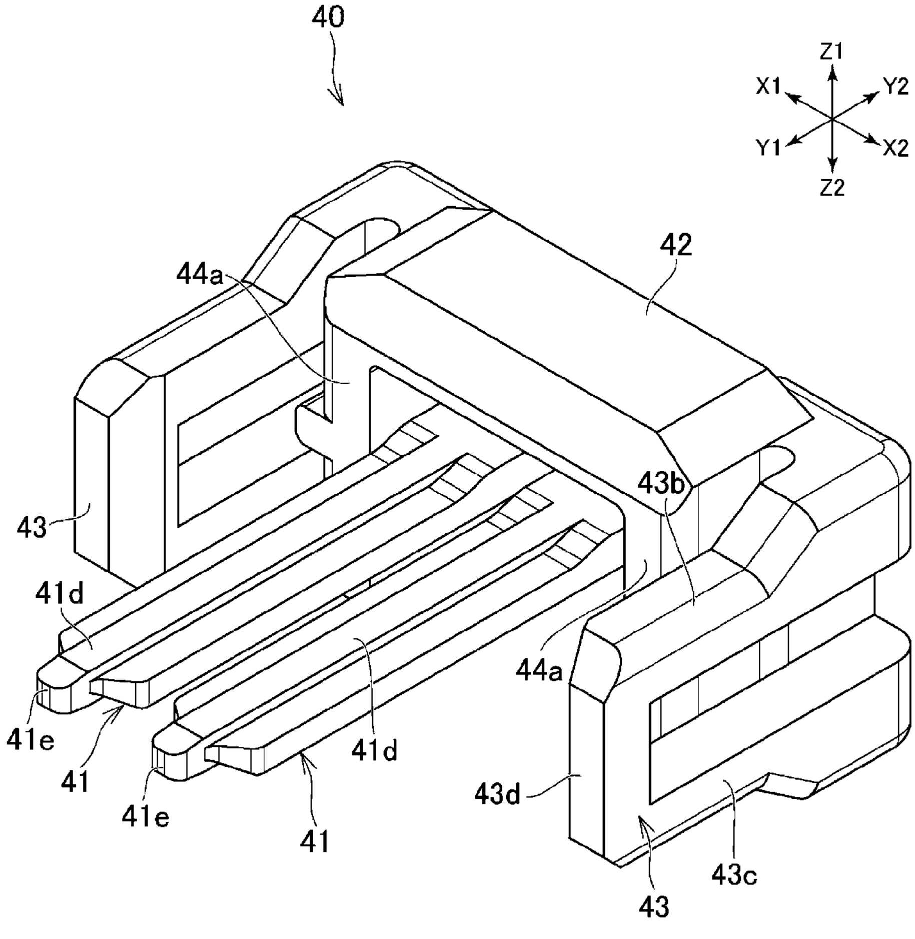
FIG. 6A is a perspective view of the retainer.

As illustrated in FIG. 6A, the retainer 40 may have a post base part 42. The positioning post 41 extends in the forward direction from the post base part 42. As illustrated in FIG. 4A, the positioning post 41 may be positioned to the rear of the inclined part 22*a* of the cable terminal 20, and may restrict movement of the cable terminal 20 in the rearward direction (in other words, detaching from the terminal storage chamber S). By forming the inclined part 22*a* in the cable terminal 20 in this manner, the relative position of the positioning post 41 can be lowered with respect to the cable terminal 20.

As illustrated in FIG. 3C, a width W2 in the vertical direction of the terminal rear part 23 (height at the position of the cable holding part 23*b*) may be smaller than a width W1 in the vertical direction of the terminal front part 21 (height at the position of the bottom plate part 21*d*). Because the width W2 of the terminal rear part 23 is smaller than W1 of the terminal front part 21, the inclined part 22*a* can be formed on the cable terminal 20 and the position of the positioning post 41 can be lowered without lowering the position of the cable holding part 23*b* relative to the terminal front part 21. As a result, the height of the connector 10 can be reduced. In other words, the height of the connector 10 can be reduced by the aforementioned relationship between the widths W1 and W2, the inclined part 22*a* formed in the cable terminal 20, and the positioning post 41.

As illustrated in FIG. 4A, the positioning post 41 can have a first extending part 41*a* extending from the post base part 42 and a second extending part 41*b* extending in the forward direction from the first extending part 41*a*. The first extending part 41*a* may extend in the downward direction while curving or bending in the rearward direction from the post base part 42. The second extending part 41*b* extends linearly from a lower end of the first extending part 41*a* in the forward direction, and is positioned to the rear of the inclined part 22*a*. An entire body of a lower surface 41*c* of the second extending part 41*b* is lower than an upper surface 21*i* of the front upper plate part 21*a*. Thereby, the position of the second extending part 41*b* is lowered, and thus the height of the connector 10 can be reduced. The second extending part 41*b* and the rear upper plate part 23*a* of the terminal rear part 23*a* may be arranged in parallel.

Note that the first extending part 41*a* of the positioning post 41 need not be curved. In this case, the positioning post 41 may extend linearly in the forward direction from a base part thereof. Furthermore, the lower surface of the linearly extending portion thereof may be lower than the upper surface 21*i* of the front upper plate part 21*a*. As described later, curvature of the first extending part 41*a* in the connector 10 allows elastic deformation of the first extending part 41*a*. If at least the first extending part 41*a* is an elastically deformable structure, the first extending part 41*a* may be of any type, may have a bent or coil shaped spring structure, or may be formed from an elastic material.

Through Hole

As illustrated in FIG. 3A, the hole Ha penetrating a metal plate, which is a material of the cable terminal 20, may be formed in a portion or all of the inclined part 22*a*. A front end 41*e* (refer to FIG. 6) of the positioning post 41 may contact an inner edge of the hole Ha and restrict movement of the cable terminal 20 in the rearward direction. More specifically, the front end 41*e* of the positioning post 41 may contact the front side 24*a* of the inner edge of the hole Ha to insert the cable terminal 20 at the appropriate position, or restrict movement of the cable terminal 20 in the rearward direction. The front side 24*a* of the inner edge of the hole Ha is the "first stopped part" described above.

According to this structure, a surface facing the rearward direction (surface with a height corresponding to the thickness of the metal plate) is formed on the front side 24*a* of the inner edge of the hole Ha. Furthermore, the front end 41*e* of the positioning post 41 (refer to FIG. 6A) is formed with a surface facing the forward direction. As a result, a force of the positioning post 41 pushing the cable terminal 20 in the forward direction efficiently acts on the cable terminal 20. In the example of the connector 10, the front end 41*e* of the positioning post 41 protrudes in the forward direction as compared to the right and left parts of the positioning post 41.

Note that in the example illustrated in FIG. 3D, the hole Ha is formed in the inclined part 22*a*, and the front side 24*a* (in other words, the first stopped part) of the inner edge of the hole Ha is positioned at a boundary between the inclined part 22*a* and the front upper plate part 21*a*. Meanwhile, the hole Ha may be formed straddling the inclined part 22*a* and the front upper plate part 21*a*. In other words, the first stopped part 24*a* may be positioned on the front upper plate part 21*a*.

In the example of the cable terminal 20, the rear side 24*b* of the inner edge of the hole Ha differs from the boundary between the inclined part 22*a* and the rear upper plate part 23*a*. This can prevent the front end 41*e* of the positioning post 41 from colliding with the rear side of the hole Ha when the positioning post 41 is inserted into the terminal storage chamber S and the front end 41*e* of the positioning post 41 contacts the front side 24*a* of the inner edge of the hole Ha. Meanwhile, the rear side 24*b* of the inner edge of the hole Ha may be positioned further in the rearward direction than the boundary between the inclined part 22*a* and the rear upper plate part 23*a*. Conversely, the rear side 24*b* of the inner edge of the hole Ha may be positioned further in the forward direction than the boundary between the inclined part 22*a* and the rear upper plate part 23*a*.

The hole Ha may not only be a hole penetrating through the metal plate, which is the material of the cable terminal 20, but may also be a recessed part having a bottom. Even in this case, the hole Ha has a front side 24*a* (first stopped part) of the inner edge thereof, and the front end 41*e* of the positioning post 41 can push the front side 24*a* of the inner edge.

The through hole Ha may be formed only in a portion of the inclined part 22*a*. In the example of the cable terminal 20, the inclined part 22*a* has a coupling shoulder part 22*c*, described later, positioned on a right side and left side of the through hole Ha. Furthermore, in the example of the cable terminal 20, the front side 24*a* (first stopped part) of the inner edge of the through hole Ha differs from the boundary between the inclined part 22*a* and the front upper plate part 21*a*, but may be positioned further in the rearward direction than the boundary. Furthermore, in the example of the cable terminal 20, the rear side 24*b* of the inner edge of the through hole Ha differs from the boundary between the inclined part 22*a* and the rear upper plate part 23*a*, but may be positioned further in the forward direction than the boundary between the inclined part 22*a* and the rear upper plate part 23*a*.

Side Part of Inclined Part

As illustrated in FIGS. 3A and 3D, the coupling part 22 may have side parts 22*b* extending in the rearward direction from the left and right side plate parts 21*b* and connecting to the rear upper plate part 23*a*. The rear upper plate part 23*a* is curved so as to surround the center line C1, and the side parts 22*b* may be connected to the right part and the left part of the rear upper plate part 23*a*, respectively. The side part 22*b* can increase the strength of the inclined part 22*a* in which the through hole Ha is formed.

As illustrated in FIGS. 3A and 3D, the terminal front part 21 has a curved shoulder part 21*f* between the front upper plate part 21*a* and the side plate part 21*b*. The inclined part 22*a* may have a portion 22*c* extending in the rearward direction from the shoulder part 21*f* and connecting to the terminal rear part 23. Hereinafter, the portion 22*c* is referred to as a coupling shoulder part. The coupling shoulder part 22*c* is a portion of the inner edge of the hole Ha between the right edge and the side part 22*b* on the right side and a portion of the inner edge of the hole Ha between the left edge and the side part 22*b* on the left side. Due to the presence of the coupling shoulder part 22*c*, the size of the hole Ha in the left-right direction is suppressed, and the strength of the coupling part 22 is ensured. Furthermore, the coupling shoulder part 22*c* curves from an upper part of the side part 22*b* toward the center in the left-right direction. The curvature also contributes to increasing the strength of the coupling part 22.

Unlike the example of cable terminal 20, the coupling part 22 may not have the coupling shoulder part 22*c*. In other words, the right edge and the left edge of the inner edge of the through hole Ha may extend to the side part 22*b* of the coupling part 22. Furthermore, the side part 22*b* may also be inclined with respect to the center line C1. Specifically, the side part 22*b* may be inclined so as to approach the center line C1 from the front end toward the rear end thereof. In other words, the coupling part 22 containing the portion 22*c* and the side part 22*b* has a substantially nozzle shape that gradually extends from the forward direction to the rearward direction thereof toward the center line C1, and has a substantially nozzle shaped configuration in which a part (lower side part in FIG. 3C) is cut out. This coupling part 22 may be formed by drawing.

As illustrated in FIG. 3C, a front part 23*c* of the right edge (lower edge on the right side) of the terminal rear part 23 and a front side 23*c* of the left edge (lower edge on the left side) of the terminal rear part 23 are connected to a lower edge 22*e* of the side part 22*d* of the coupling part 22. The front parts 23*c* of the left and right edges of the terminal rear part 23 extend in the forward and downward directions. Thereby, the size of the coupling part 22 in the vertical direction can be ensured, and the strength of the coupling part 22 can be ensured. Furthermore, the front part of the lower edge 22*e* of the coupling part 22 descends in a curved manner, and connects to a rear edge of the side plate part 21*b*. Thereby, the connection strength between the coupling part 22 and the side plate part 21*b* can be increased.

Second Stopped Part

As described above, as illustrated in FIG. 3B, the cable terminal 20 may have bottom plate parts 21*d* that respectively extend from the lower end of the side plate part 21*b* and is positioned on an opposite side from the front upper plate part 21*a* with the center line C1 interposed therebetween. In the example of the connector 10, the terminal front part 21 may have two bottom plate parts 21*d* extending from the left and right side plate parts 21*b* and overlapping each other. Meanwhile, the bottom plate part 21*d* may be formed only on one of the side plate parts 21*b*. The bottom plate part 21*d* may be connected to the side plate part 21*b* on an opposite side.

The locking arm 31 (refer to FIG. 4A) of the housing 30 has a stopper part 31*a* positioned to the rear of the bottom plate part 21*d*. When the cable terminal 20 is at the appropriate position in the terminal storage chamber S, the stopper part 31*a* is positioned to the rear of the rear edge of the bottom plate part 21*d* (second stopped part 21*e*) and restricts movement of the cable terminal 20 in the rearward direction.

Figure 4B:
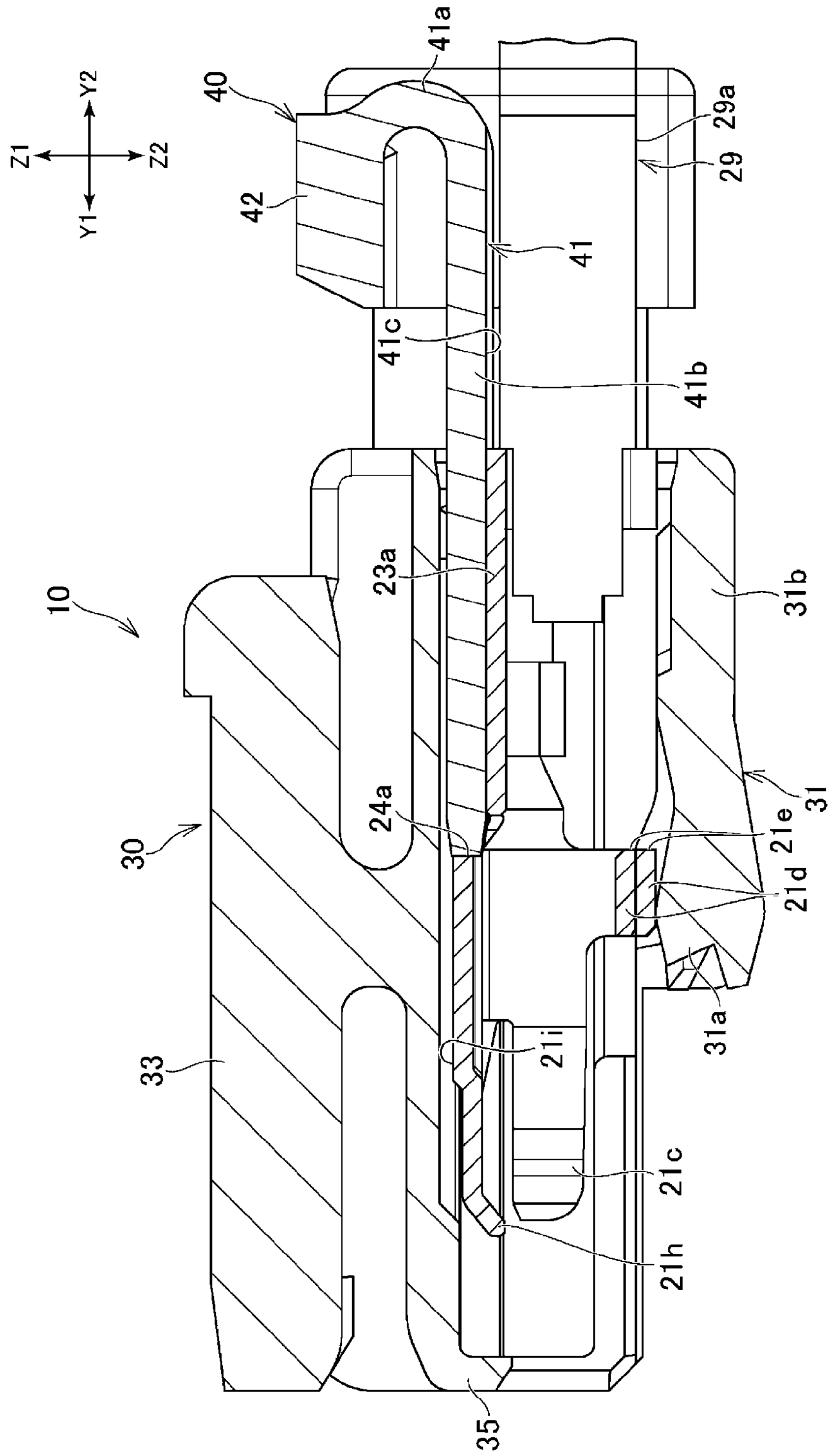
FIG. 4B is a cross-sectional view of the connector. A process is illustrated where a cable terminal is inserted.

The locking arm 31 is vertically movable about a base part 31*b* thereof. In a process in which the cable terminal 20 is inserted from the rear side to the front side of the housing 30, the locking arm 31 is pushed in the downward direction by the bottom plate part 21*d* of the cable terminal 20, as illustrated in FIG. 4B. Thereafter, when the bottom plate part 21*d* rides up over the protruding part of the locking arm 31 and the cable terminal 20 reaches the appropriate position illustrated in FIG. 4A, the locking arm 31 returns to an initial position due to an elastic force thereof. As a result, the stopper part 31*a* is positioned to the rear of the rear edge (second stopped part 21*e*) of the bottom plate part 21*d*.

As illustrated in FIG. 3C, the inclined part 22 is connected to the rear edge of the terminal front part 21. The bottom plate part 21*d* in which the second stopped part 21*e* is formed at the rearmost part of the terminal front part 21. Therefore, the position of the front side 24*a* (first stopped part) of the hole Ha formed in the inclined part 22 in the front-rear direction may essentially match the position of the rear edge 21*e* (second stopped part) of the bottom plate part 21*d* in the front-rear direction.

Retainer

The retainer 40 will be described in detail. The retainer 40 has a plurality of the positioning posts 41 and the post base part 42. The post base part 42 bridges left and right wall parts 44*a* of the retainer 40 as illustrated in FIG. 6A. The same number of positioning posts 41 as the cable terminals 20 are connected to the post base part 42.

The positioning posts 41 may be elastically deformable to move in the front-rear direction. For example, the positioning post 41 may have the first extending part 41*a* connected to the post base part 42 and the second extending part 41*b* extending in the forward direction from the first extending part 41*a*, as illustrated in FIG. 4A. Movement of the first extending part 41*a* about the post base part 42 may change the position of the second extending part 41*b* in the front-rear direction. The positioning posts 41 may be elastically deformable to move in the front-rear direction as well as in the left-right direction. In the example of the retainer 40, movement of the first extending part 41*a* about the post base part 42 may change the position of the second extending part 41*b* in the left-right direction.

According to the retainer 40, the dimensional tolerances of a member can be absorbed by elastic deformation of the positioning post 41. As a result, the retainer 40 can be properly attached to the housing 30 and the cable terminal 20 can be reliably provided at the appropriate position. With a conventional connector, the engaging part 43 of the retainer 40 may not engage with the part to be engaged 34 of the housing 30 when the positioning post 41 presses the first stopped part 24*a* of the cable terminal 20 and inserts the cable terminal 20 to a foremost part of the housing 30, due to the influence of the dimensional tolerances of each part and accumulated clearance values between each part. However, in the connector 10 of the present disclosure, even when the cable terminal 20 is inserted to the foremost part of the housing 30 and is formed at the foremost part of the housing 30, and the front end 21*h* of the front upper plate part 21*a* of the cable terminal 20 collides with the front stopper part 35 exposed in the terminal storage chamber S, the second extending part 41*b* moves in the rearward direction due to elastic deformation of the first extending part 41*a* of the retainer 40. As a result, the engaging part 43 of the retainer 40 can be engaged with the part to be engaged 34 of the housing 30. In this manner, the cable terminal 20 is reliably inserted into the foremost part (appropriate position) of the housing 30, and a clearance between the second stopped part 21*e* (refer to FIG. 4A) and the stopper part 31*a* of the locking arm 31 can be reduced. Thus, the connector can be reduced in size.

The positioning post 41 may have at least one curved or bent portion between the post base part 42 and the front end 41*e* of the positioning post 41. This allows elastic deformation of the positioning post 41. In the example of the connector 10, the first extending part 41*a* connected to the post base part 42 extends in the downward direction from the rear side of the post base part 42 while curving. The second extending part 41*b* extends in the forward direction from the lower end of the first extending part 41*a*. The second extending part 41*b* is formed along a straight line, for example. The second extending part 41*b* and the post base part 42 overlap with each other when viewed in a direction orthogonal to the extending direction of the second extending part 41*b*. More specifically, the second extending part 41*b* and the post base part 42 overlap in a plan view.

As illustrated in FIG. 4A, a thickness W8 of the first extending part 41*a* (curved portion) is smaller than a thickness W6 of the post base part 42. Thereby, deformation of the post base part 42 is suppressed, and deformation of the first extending part 41*a* is easily allowed. In the example of the retainer 40, the thickness of the second extending part 41*a* and the thickness of the first extending part 41*a* may essentially be the same.

As illustrated in FIG. 4A, a width W7 in the front-rear direction of the post base part 42 is greater than the thickness W6 in the vertical direction. Thereby, when the front end 41*e* of the positioning post 41 contacts the first stopped part 24*a* (edge on the front side of the hole Ha), the post base part 42 can be suppressed from being displaced in the rearward direction.

As illustrated in FIG. 4A, the position of the upper surface 42*a* of the post base part 42 is lower than the height of an uppermost part of the housing 30. In the example of the connector 10, the position of the upper surface 42*a* of the post base part 42 is lower than the uppermost part 33*a* of the locking arm 33. This arrangement of the post base part 42 can prevent the presence of the post base part 42 from becoming a site that increases the height of the connector 10.

As illustrated in FIG. 4A, the first extending part 41*a* (curved portion) extends from the rear side of the post base part 42, and the rearmost part 41*f* of the first extending part 41*a* is positioned further in the rearward direction than the rear end 42*b* of the post base part 42. The retainer 40 has a portion that is positioned in the right or left directions with respect to the first extending part 41*a* and further in the rearward direction than the rearmost part 41*f* of the first extending part 41*a*. Thereby, a space for allowing deformation of the first extending part 41*a* (curved portion) can be secured by this portion. In the example of connector 10, as illustrated in FIG. 2, the retainer 40 has a side wall part 45 positioned on the right and left sides of two positioning posts 41. As illustrated in FIG. 4A, the rear surface 45*a* of the side wall part 45 is positioned further in the rearward direction than the rearmost part 41*f* of the first extending part 41*a*. Furthermore, the side wall part 45 overlaps with the rearmost part 41*f* of the first extending part 41*a* in a side surface view. In other words, an upper end of the rear surface 45*a* of the side wall part 45 is positioned further in the upward direction than the rearmost part 41*f* of the first extending part 41*a*, and a lower end of the rear surface 45*a* of the side wall part 45 is positioned further in the downward direction than the rearmost part 41*f* of the first extending part 41*a*. Thereby, a space for allowing deformation of the first extending part 41*a* (curved portion) can be secured by the rear surface 45*a* of the side wall part 45.

Note that unlike the example described herein, the retainer 40 may have a portion that is positioned in the upward or downward direction from the first extending part 41*a* and further in the rearward direction than the rearmost part 41*f* of the first extending part 41*a*. Even in this case, a space for allowing deformation of the first extending part 41*a* (curved portion) can be secured by this portion.

Figure 6B:
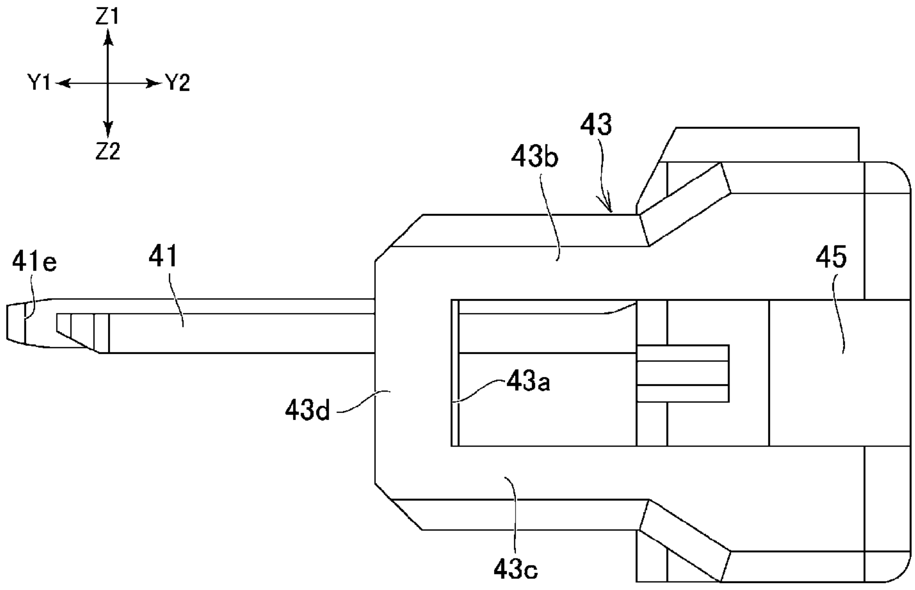
FIG. 6B is a side surface view of the retainer.

As described above, the retainer 40 may have engaging parts 43 on left and right side parts thereof. As illustrated in FIG. 6A, the engaging part 43 is a substantially U-shaped site in a side surface view extending toward the side surface of the housing 30, for example. The engaging part 43 has an upper extending part 43*b* and a lower extending part 43*c* extending in the forward direction from the side wall part 45. Furthermore, the engaging part 43 has a front part 43*d* formed on tip ends of the upper extending part 43*b* and the lower extending part 43*c*. The positioning posts 41 extend in the forward direction beyond a front surface of the front part 43*d* of the engaging part 43. As illustrated in FIG. 6B, in a side surface view of the retainer 40, the positioning post 41 is positioned between an upper surface of the engaging part 43 (upper surface of the upper extending part 43*b*) and a lower surface of the engaging part 43 (lower surface of the lower extending part 43*c*). More specifically, in a side surface view of the retainer 40, the positioning post 41 overlaps a rear surface of the front part 43*d*, for example, an opposing surface 43*a* opposite from the front surface of the part to be engaged 34. Based on this positional relationship between the positioning post 41 and the engaging part 43, when an engaging force between the engaging part 43 of the retainer 40 and the part to be engaged 34 of the housing 30 (force that pulls the retainer 40 forward) is transmitted through the positioning post 41 to the first stopper part 24*a*, a moment is less likely to occur with respect to the retainer 40.

As illustrated in FIG. 6A, a protruding part 41*d* extending in the forward direction may be formed on the second extending part 41*b*. In other words, a right part and left part of the upper surface of the second extending part 41*b* may be lower than the center. Thereby, interference can be avoided between the protruding part 30*f* (refer to FIG. 7A) formed on the inner surface of the terminal storage chamber S and the second extending part 41*b*. Furthermore, the protruding part 41*d* can increase the strength of the positioning post 41.

As described above, the first extending part 41*a* is connected to the rear side of the post base part 42 (refer to FIG. 4A). This allows the distance between the post base part 42 and the rear surface 30*c* of the housing 30 to be reduced. As a result, change can be reduced in the relative position of the housing 30 and the retainer 40 (for example, change in position in the left-right direction).

Note that the shape of the positioning post 41 is not limited to the example of the connector 10. For example, the first extending part 41*a* may linearly extend in a diagonal downward direction. Furthermore, the second extending part 41*b* may extend in the forward direction from the lower end of the first extending part 41*a*. A curved portion may be formed in the forward direction from the post base part 42 to allow for elastic deformation.

Positioning Post Length and Initial Position

As illustrated in FIG. 4A, the housing 30 has a front stopper part 35 that restricts movement of the cable terminal 20 in the forward direction. The front stopper part 35 may be, for example, a wall formed on the front end of the terminal storage chamber S. When the cable terminal 20 is inserted into the foremost part of the terminal storage chamber S, the front end 21*h* of the front upper plate part 21*a* of the cable terminal 20 contacts the front stopper part 35.

In a state in which the retainer 40 is attached to the housing 30 (hereinafter, referred to as a retainer attached state), the front end 41*e* of the positioning post 41 contacts the first stopped part 24*a* (in other words, the front side of the inner edge of the hole Ha). In other words, the length and initial position of the positioning post 41 are set such that, regardless of dimensional tolerances of the retainer 40, cable terminal 20, and housing 30, the front end 41*e* of the post 41 comes into contact with the first stopped part 24*a* in the retainer attached state. By doing so, the cable terminal 20 can be reliably provided at the appropriate position, and the retainer 40 can be attached to the housing 30. The retainer attached state refers to a state in which the movement of the cable terminal 20 in the forward direction is restricted by the front stopper part 35 and the engaging part 43 of the retainer 40 engages with the part to be engaged 34 of the housing 30. In the retainer attached state, there is no clearance in the front-rear direction between opposing surfaces 43*a*, 34*a*

(refer to FIG. 5) of the engaging part 43 and the part to be engaged 34. Note that the length and initial position of the positioning post 41 may be set such that, regardless of the dimensional tolerances of the retainer 40 and the like, the front end 41*e* of the post 41 pushes the first stopped part 24*a* in the forward direction in the retainer attached state. In other words, in the retainer attached state, the front end 41*e* of the post 41 preferably contacts the first stopped part 24*a*, and the positioning post 41 is preferably elastically deformed in the rearward direction. Then, the front end 41*e* of the post 41 preferably pushes the first stopped part 24*a* in the forward direction by the elastic force of the positioning post 41.

As described above, the retainer 40 has a plurality of positioning posts 41. The length and initial position of the positioning posts 41 are set such that the front end 41*e* of all of the positioning posts 41 in the retainer attached state contacts the first stopped part 24*a* of the cable terminal 20.

The retainer 40 does not have a surface that faces in the forward direction and contacts the housing 30 in the retainer attached state, except for the front end 41*e* of the positioning post 41. For example, as illustrated in FIG. 4A, the front surface of the retainer 40 (specifically, the front surface 42*a* of the post base part 42) is separated from the rear surface 30*c* of the housing 30, ensuring clearance between the two. By doing so, movement of the retainer 40 in the forward direction is restricted only by the first stopped part 24*a* against which the front end 41*e* of the positioning post 41 makes contact. As a result, the cable terminal 20 can be pushed in the forward direction by the positioning post 41 until the cable terminal 20 contacts the front stopper part 35, and therefore, the cable terminal 20 can be more reliably provided at the appropriate position.

Second Stopped Part

As illustrated in FIG. 4A, clearance is ensured between the second stopped part 21*e* (the rear edge of the bottom plate part 21*d*) and the stopper part 31*a* of the locking arm 31. In the example of the connector 10, because the positioning post 41 is elastically deformable, the clearance between the second stopped part 21*e* and the stopper part 31*a* can be set to be small The clearance may be the same as the thickness of the two bottom plate parts 21*d*, for example, or may be less than the thickness of the two bottom plate parts 21*d*.

As described above, because the inclined part 22 is formed in the cable terminal 20, the height of the upper surface of the terminal rear part 23 is lower than the height of the upper surface of the front upper plate part 21*a*. The second extending part 41*b* of the positioning post 41 extends linearly along the upper surface of the terminal rear part 23. The entire body of the second extending part 41*b* is positioned to the rear of the first stopped part 24*a*. In the retainer attached state, the post base part 42 is positioned to the rear of the housing 30 and is positioned in the upward direction from the rear part of the second extending part 41*b*.

Figure 8:
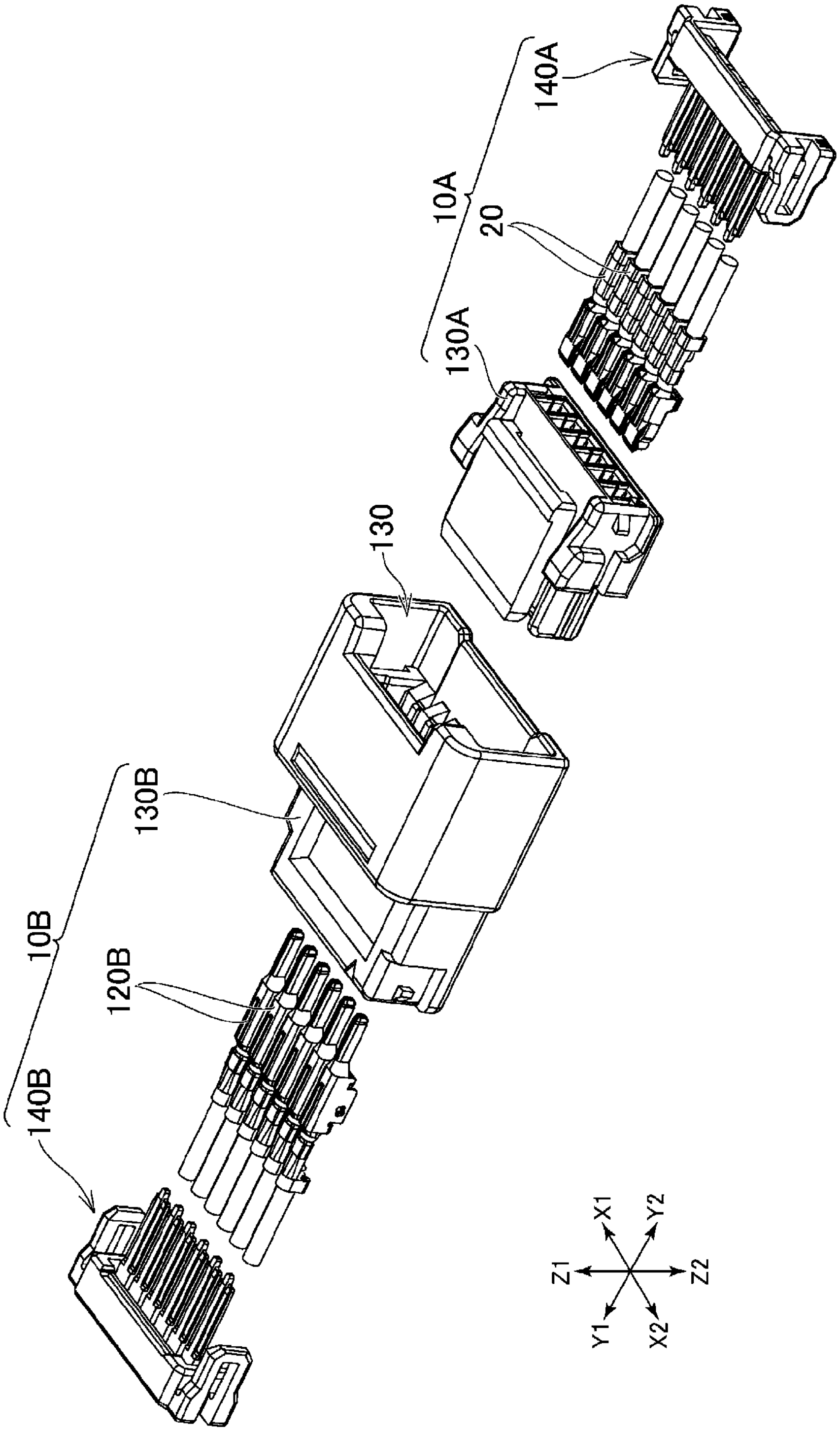
FIG. 8 is a perspective view illustrating a connector assembly according to a modified example.

FIG. 8 is a diagram illustrating a connector assembly according to a modified example. The connector assembly has a first connector 10A and a second connector 10B. In the example illustrated in the diagram, the structures of the connector 1 described above, specifically, the positioning post 41, an inclined part 22*a* of the cable terminal 20, the hole Ha, and the like are applied to the two connectors 10A and 10B. Hereinafter, differences between connectors 10A and 10B and the aforementioned connector 10 will be described. For matters not described, a structure of the connector 10 may also be applied to the two connectors 10A, 10B.

The first connector 10A has a housing 130A, a plurality of the cable terminals 20, and a retainer 140A. In the example illustrated in FIG. 8, the first connector 10A has six cable terminals 20. Similar to the housing 30 described above, a plurality of terminal storage chambers S into which the cable terminals 20 are inserted are formed in the housing 130A. A structure of the housing 130A may be the same as the housing 30 described above except for the number of the terminal storage chambers S. The retainer 140A has a plurality of positioning posts 41, similar to the retainer 40 described above. A structure of retainer 140A may be similar to the retainer 40 described above except for the number of positioning posts 41.

The second connector 10B has a housing 130B, a plurality of cable terminals 120B, and a retainer 140B. The second connector 10B has six cable terminals 120B that are inserted inside the contact part 21*c* (refer to FIG. 3A) of the cable terminals 20 of the first connector 10A. A plurality of terminal storage chambers into which the cable terminals 120B are inserted is formed in the housing 130B. Furthermore, the housing 130B has a box shaped mating part 130A that opens to the first connector 10A side in which the housing 130A of the first connector 10A mates to an inner side. The retainer 140B has a plurality of the positioning posts 41, similar to the retainers 40, 140A described above. Meanwhile, the cable terminal 120B has a hole formed with an inner edge to which an end part of the positioning post 41 contacts.

Summary

As described above, in the connectors 10, 10A, 10B proposed in the present disclosure, the cable terminals 20, 120B have the inclined part 22 formed between the front upper plate part 21*a* and the rear upper plate part 23*a* and inclined so as to approach the center line C1 toward the rear side. The retainer 40 has the positioning post 41 that is positioned to the rear of the inclined part 22 and restricts movement of the cable terminal 20 in the rearward direction of the cable terminal 20. According to this structure, the positioning post 41 can prevent the housing 30 and the cable terminal 20 from being partially mated. Furthermore, the relative position of the positioning posts 41 with respect to the cable terminals 20 can be lowered. Note that the structures of the cable terminals 20, 120B having the inclined part 22*a* may be applied to a connector having a retainer in which a positioning post that is not elastically deformable is formed.

The cable terminals 20, 120B proposed in the present disclosure have the inclined part 22 formed between the front upper plate part 21*a* and the rear upper plate part 23*a* and inclined so as to approach the center line C1 toward the rear side. At least a portion of the inner edge of the hole Ha penetrating the metal plate, which is a material of the cable terminal 20, is positioned in the inclined part 22. According to this structure, the height of the positioning post 41 with regard to the inclined part 22 can be lowered. Furthermore, by applying the front end 41*e* of the positioning post 41 to the inner surface of the hole Ha, the force of the positioning post 41 is efficiently transmitted to the cable terminal 20.

In the connectors 10, 10A, 10B proposed in the present disclosure, the positioning post 41 is elastically deformable to move in the front-rear direction. According to the connector, the dimensional tolerances of a member can be absorbed by elastic deformation of the positioning posts 41. As a result, the retainer 40 can be appropriately attached to the housing 30 while reliably arranging the cable terminal 20 at the appropriate position even when the clearance between members is reduced in order to reduce the size of the connector 10. Note that the structure in which the positioning post 41 is elastically deformable may be applied to a connector in which the inclined part 22 is not formed in the cable terminal 20.

The invention claimed is:

1. A connector, comprising:

a cable terminal formed by a metal plate which is configured to be provided at an end of a cable, the cable terminal including a terminal front part having a front plate part formed along a center line of the cable terminal in a front-rear direction, a terminal rear part having a rear plate part formed along the center line of the cable terminal, and an inclined part formed between the front plate part and the rear plate part and inclined to approach the center line toward a rear side of the cable terminal, wherein a hole is formed through the metal plate such that at least a part of an inner edge of the hole is positioned in the inclined part;

a housing having a rear side, a front side and a terminal storage chamber, wherein the cable terminal is configured to be received into the terminal storage chamber from the rear side of the housing toward the front side of the housing; and a retainer configured to be attached to the housing, the retainer including a positioning post which is configured to be positioned to a rear of the inclined part and configured to restrict movement of the cable terminal in a rearward direction of the cable terminal.

2. The connector according to claim 1, wherein the positioning post includes an extending part positioned behind the inclined part that extends in a straight line along the rear plate part.

3. The connector according to claim 1, wherein the terminal front part has left and right side plate parts extending from left and right edges, respectively, of the front plate part, and the inclined part includes side parts respectively extending rearwardly from the left and right side plate parts and which connects to the terminal rear part.

4. The connector according to claim 1, wherein the cable terminal has left and right side plate parts that extend from left and right edges, respectively, of the front plate part, and a bottom plate part extending from the left and right side plate parts and positioned on an opposite side of the front plate part across the center line.

5. The connector according to claim 4, wherein the housing has a locking arm configured to restrict movement of the cable terminal in the rearward direction.

6. A cable terminal formed by a metal plate and provided at an end of a cable, comprising:

a terminal front part having a front plate part formed along a center line of the cable terminal along a front-rear direction;

a terminal rear part having a rear plate part formed along the center line;

an inclined part formed between the front plate part and the rear plate part and inclined to approach the center line toward a rear side of the cable terminal; and a hole having at least one part of an inner edge thereof provided in the inclined part.

7. The cable terminal according to claim 6, wherein the at least part of the inner edge of the hole forms a right side coupling shoulder part positioned on a right side of the hole and a left side coupling shoulder part positioned on a left side of the hole.

8. The cable terminal according to claim 6, wherein the at least part of the inner edge of the hole is at least one of a front side of the inner edge of the hole and a rear side of the inner edge of the hole.

9. The cable terminal according to claim 6, wherein an entirely of the inner edge of the hole is in the inclined part.

10. The cable terminal according to claim 6, wherein the hole penetrates through the metal plate.

11. The cable terminal according to claim 6, wherein the hole forms a recessed part having a bottom.

12. The cable terminal according to claim 6, wherein the terminal front part has left and right side plate parts extending from left and right edges, respectively, of the front plate part, and the inclined part includes a side part extending rearwardly from the left and right side plate parts and which connects to the terminal rear part.

13. The cable terminal according to claim 6, further comprising left and right side plate parts extending from left and right edges, respectively, of the front plate part, and a bottom plate part extending from the left and right side plate parts and positioned on an opposite side of the front plate part across the center line.

14. The connector according to claim 1, wherein the at least part of the inner edge of the hole forms a right side coupling shoulder part positioned on a right side of the hole and a left side coupling shoulder part positioned on a left side of the hole.

15. The connector according to claim 1, wherein the at least part of the inner edge of the hole is at least one of a front side of the inner edge of the hole and a rear side of the inner edge of the hole.

16. The connector according to claim 1, wherein an entirely of the inner edge of the hole is in the inclined part.

17. The connector according to claim 1, wherein the hole penetrates through the metal plate.

18. The connector according to claim 1, wherein the hole forms a recessed part having a bottom.

19. The connector according to claim 2, wherein the positioning post includes an elastically deformable part from which the extending part extends.

* * * * *